(12) United States Patent
Simpson

(10) Patent No.: US 10,673,548 B2
(45) Date of Patent: Jun. 2, 2020

(54) DECISION FEEDBACK EQUALIZATION CORRECTION OF EYE SCOPE MEASUREMENTS

(71) Applicant: Kandou Labs, S.A., Lausanne (CH)

(72) Inventor: Richard Simpson, Bedford (GB)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/214,009

(22) Filed: Dec. 7, 2018

(65) Prior Publication Data

US 2019/0181970 A1 Jun. 13, 2019

Related U.S. Application Data

(60) Provisional application No. 62/595,690, filed on Dec. 7, 2017.

(51) Int. Cl.
| | | |
|---|---|---|
| *H04L 7/00* | (2006.01) | |
| *H04B 17/364* | (2015.01) | |
| *H04L 7/04* | (2006.01) | |
| *H04L 25/02* | (2006.01) | |
| *H04L 1/00* | (2006.01) | |
| *H04L 25/03* | (2006.01) | |
| *H04B 3/466* | (2015.01) | |

(Continued)

(52) U.S. Cl.
CPC .......... *H04B 17/364* (2015.01); *H04B 3/466* (2013.01); *H04L 1/0041* (2013.01); *H04L 7/0012* (2013.01); *H04L 7/041* (2013.01); *H04L 25/028* (2013.01); *H04L 25/0292* (2013.01); *H04L 25/03057* (2013.01); *H04L 25/063* (2013.01); *G06F 11/322* (2013.01)

(58) Field of Classification Search
CPC ... H04B 17/364; H04L 1/0041; H04L 7/0012; H04L 7/041; H04L 25/028; H04L 25/0292
USPC .......................... 375/355, 354, 316, 219, 295
See application file for complete search history.

(56) References Cited

U.S. PATENT DOCUMENTS

| | | |
|---|---|---|
| 7,339,990 B2 | 3/2008 | Hidaka |
| 7,869,497 B2 | 1/2011 | Benvenuto et al. |

(Continued)

OTHER PUBLICATIONS

Hidaka, Yasuo , et al., "A 4-Channel 1.25-10.3 Gb/s Backplane Transceiver Macro With 35 dB Equalizer and Sign-Based Zero-Forcing Adaptive Control", IEEE Journal of Solid-State Circuits, vol. 44, No. 12, Dec. 2009, 3547-3559 (13 pages).

(Continued)

*Primary Examiner* — Zewdu A Kassa
(74) *Attorney, Agent, or Firm* — Invention Mine LLC

(57) ABSTRACT

Methods and systems are described for obtaining a plurality of BER-specific correction values by comparing a first set of BER values obtained by sampling, at a sampling instant near the center of a signaling interval, a non-DFE corrected received signal with a second set of BER values obtained by sampling a DFE-corrected received signal at the sampling instant. A set of eye-scope BER measurements are obtained, each eye-scope BER measurement having a sampling offset relative to the sampling instant, a voltage offset value representing a voltage offset applied to alter a decision threshold, and an eye-scope BER value. A set of DFE-adjusted eye-scope BER measurements are generated by using BER-specific correction values to adjust the voltage offset values of the eye-scope BER measurements.

18 Claims, 16 Drawing Sheets

(51) Int. Cl.
*H04L 25/06* (2006.01)
*G06F 11/32* (2006.01)

(56) References Cited

U.S. PATENT DOCUMENTS

| | | |
|---|---|---|
| 7,873,115 B2 | 1/2011 | Zerbe et al. |
| 8,074,126 B1 | 12/2011 | Qian et al. |
| 8,472,513 B2 | 6/2013 | Malipatil et al. |
| 8,744,012 B1 | 6/2014 | Ding et al. |
| 8,791,735 B1 | 7/2014 | Shibasaki |
| 9,083,576 B1 | 7/2015 | Hormati |
| 9,397,868 B1 | 7/2016 | Hossain et al. |
| 9,438,409 B1 | 9/2016 | Liao et al. |
| 9,520,883 B2 | 12/2016 | Shibasaki |
| 9,571,309 B1 | 2/2017 | Sakai |
| 9,577,815 B1 | 2/2017 | Simpson et al. |
| 10,003,315 B2 | 6/2018 | Tajalli |
| 2006/0227912 A1 | 10/2006 | Leibowitz et al. |
| 2006/0233291 A1 | 10/2006 | Garlepp et al. |
| 2008/0069198 A1 | 3/2008 | Bhoja et al. |
| 2010/0020862 A1 | 1/2010 | Peng |
| 2010/0329322 A1* | 12/2010 | Mobin ............... H04L 25/03057 375/231 |
| 2010/0329325 A1 | 12/2010 | Mobin et al. |
| 2011/0268225 A1 | 11/2011 | Cronie et al. |
| 2011/0286497 A1 | 11/2011 | Nervig |
| 2012/0082203 A1 | 4/2012 | Zerbe et al. |
| 2012/0213267 A1 | 8/2012 | Stojanovic et al. |
| 2012/0327993 A1 | 12/2012 | Palmer |
| 2013/0322512 A1 | 12/2013 | Francese et al. |
| 2014/0270030 A1 | 9/2014 | Hammad et al. |
| 2014/0286381 A1 | 9/2014 | Shibasaki |
| 2015/0117579 A1 | 4/2015 | Shibasaki |
| 2015/0180642 A1 | 6/2015 | Hsieh et al. |
| 2015/0319015 A1 | 11/2015 | Malhotra |
| 2016/0056980 A1* | 2/2016 | Wang ............... H04L 25/03057 375/233 |
| 2017/0019276 A1 | 1/2017 | Francese |
| 2017/0373889 A1 | 12/2017 | Sakai |
| 2018/0083638 A1 | 3/2018 | Tajalli |

OTHER PUBLICATIONS

Holden, Brian, "An exploration of the technical feasibility of the major technology options for 400GE backplanes", IEEE 802.3 400GE Study Group, Geneva, CH, Jul. 16, 2013, 1-18 (18 pages).

Navid, Reza, et al., "A 40 Gb/s Serial Link Transceiver in 28 nm CMOS Technology", IEEE Journal of Solid-State circuits, vol. 50, No. 4, Apr. 2015, 814-827 (14 pages).

Shibasaki, Takayuki, et al., "A 56-Gb/s Receiver Front-End with a CTLE and 1-Tap DFE in 20-nm CMOS", IEEE 2014 Symposium on VLSI Circuits Digest of Technical Papers, 2014, (2 pages).

Won, Hyosup, et al., "A 28-Gb/s Receiver With Self-contained Adaptive Equalization and Sampling Point Control Using Stochastic Sigma-Tracking Eye-Opening Monitor", IEEE Transactions on Circuits and Systems—I: Regular Papers, vol. 64, No. 3, Mar. 2017, 664-674 (11 pages).

International Search Report and Written Opinion for PCT/US2018/064619, dated Jun. 13, 2019, 1-11 (11 pages).

\* cited by examiner

Eye Diagram, 10 tap DFE correction

DECISION FEEDBACK EQUALIZATION CORRECTION OF EYE SCOPE MEASUREMENTS

CROSS-REFERENCE TO RELATED APPLICATIONS

This application claims the benefit of U.S. Provisional Application No. 62/595,690, filed Dec. 7, 2017, naming Richard Simpson, entitled "Decision Feedback Equalization Correction of Eye Scope Measurements", which is hereby incorporated herein by reference in its entirety for all purposes.

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. patent application Ser. No. 14/926,958, filed Oct. 29, 2015, naming Richard Simpson, Andrew Stewart, and Ali Hormati, entitled "Clock Data Alignment System for Vector Signaling Code Communications Link", hereinafter identified as [Stewart I].

U.S. patent application Ser. No. 14/925,686, filed Oct. 28, 2015, naming Armin Tajalli, entitled "Advanced Phase Interpolator", hereinafter identified as [Tajalli I].

U.S. Provisional Patent Application No. 62/286,717, filed Jan. 25, 2016, naming Armin Tajalli, entitled "Voltage Sampler Driver with Enhanced High-Frequency Gain", hereinafter identified as [Tajalli II].

U.S. patent application Ser. No. 15/603,404 filed May 23, 2017, naming Armin Tajalli, entitled "Phase Rotation Circuit for Eye Scope Measurements", hereinafter identified as [Tajalli III].

FIELD OF THE INVENTION

The present embodiments relate to communications systems circuits generally, and more particularly to the acquisition and presentation of graphical performance information associated with operation of a high-speed multi-wire interface used for chip-to-chip communication.

BACKGROUND

In modern digital systems, digital information has to be processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods have been proposed to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals from the transmitter to one or more receivers. At a receiver, the received signals corresponding to the codeword are transformed back into the original digital information representation space. Herein, this process is referred to as "decoding".

Regardless of the encoding method used, the received signals presented to the receiving device must be sampled (or their signal value otherwise recorded) at intervals best representing the original transmitted values, regardless of transmission channel delays, interference, and noise.

To enable diagnostic and/or quality assurance monitoring, additional sampling capabilities may be provided with outputs directed to a management or control/status interface, allowing real-time or statistical assessment of interface behavior. In some cases, the timing and sampling threshold for such additional sampling may be controlled independent of data reception, allowing background collection of data which may be displayed in a so-called "eye scope" representation illustrating historical signal amplitudes and timings relative to the current data detection threshold and sampling time.

BRIEF DESCRIPTION

To reliably detect the data values transmitted over a communications system, a receiver must accurately measure the received signal value amplitudes at carefully selected times. Various methods are known to facilitate such receive measurements, including reception of one or more dedicated clock signals associated with the transmitted data stream, extraction of clock signals embedded within the transmitted data stream, and synthesis of a local receive clock from known attributes of the communicated data stream.

In general, the receiver embodiments of such timing methods are described as Clock-Data Recovery (CDR), often based on Phase-Lock Loop (PLL) or Delay-Locked Loop (DLL) synthesis of a local receive clock having the desired frequency and phase characteristics.

In both PLL and DLL embodiments, a Phase Detector compares the relative phase (and in some variations, the relative frequency) of a received reference signal and a local clock signal to produce an error signal, which is subsequently used to correct the phase and/or frequency of the local clock source and thus minimize the error. As this feedback loop behavior will lead to a given PLL embodiment producing a fixed phase relationship (as examples, 0 degrees or 90 degrees of phase offset) between the reference signal and the local clock, an additional fixed or variable phase adjustment is often introduced to permit the phase offset to be set to a different desired value (as one example, 45 degrees of phase offset) to facilitate receiver data detection.

Statistical graphs of received data over time, commonly called "eye diagrams" are a well-known tool for analyzing received signal quality. Capturing the data needed to plot such a diagram includes measuring received signals at multiple sampling points distributed across both signal amplitude and time. To avoid disruption of normal data reception, one or more additional data samplers may be provided to perform these measurements independent of the amplitude threshold and time interval chosen for optimum data reception.

In some communications networks, variations in network propagation characteristics can induce signal attenuations and reflections that manifest as interference to subsequently transmitted data, as so-called Inter-Symbol Interference or ISI.

Decision Feedback Equalization (DFE) is one well-known technique used to compensate for the effects of ISI. A receiver maintains a history of previously received data values and uses an internal model or estimation of network characteristics to compute the ISI effects those previous data values would produce on such a network. The model is typically referred to as a channel model, channel taps, or channel impulse response. This estimation, known as the DFE correction, may then be applied to the currently received signal prior to data sampling, improving received signal quality.

Because the DFE correction is dynamically computed based on the historical time sequence of previously received data values, it inherently also changes over time, complicating its application to information obtained at a different sampling time, such as the information used to plot eye diagrams. In particular, eye diagram samples may be unable to take advantage of the data sample's DFE correction: the result of that computation may not yet be available for eye samples obtained earlier than (i.e., displayed to the left of) the received data sampling time, while that computation's result may already be obsolete for eye samples obtained later than (i.e. displayed to the right of) the received data sampling time.

Methods and systems are described that (i) determine an uncorrected eye diagram, (ii) measure an improvement to the eye-opening at the center of the eye afforded by the use of DFE, and (iii) use the measured improvement to provide a corrected eye diagram. Such methods may include generating, using a data sampler, a sequence of data decisions at a reference sampling instant using a reference voltage, generating a set of error counts, each error count generated by comparing decisions from an eye sampler formed at a respective sampling instant of a plurality of sampling instants using a respective voltage offset of a plurality of voltage offsets to corresponding data decisions of the sequence of data decisions, and generating a set of DFE-compensated error counts, each DFE-compensated error count generated by comparing decisions from the eye sampler formed using a DFE-modified voltage offset at the reference sampling instant to corresponding data decisions of the sequence of data decisions.

Furthermore, methods and systems are described for obtaining respective error counts for a plurality of measurement points, each measurement point corresponding to a data decision at a respective sampling instant according to a respective offset voltage, and obtaining respective DFE-compensated error counts for a subset of measurement points of the plurality of measurement points, the subset of measurement points comprising measurement points taken at a reference sampling instant at a plurality of DFE-modified voltage offsets. Such a method may further include determining a DFE-compensation offset based on a selected DFE-compensated error count and a corresponding error count for a measurement point taken at the reference sampling instant, the selected DFE-compensated error count and the corresponding error count having equal bit-error rates (BERs).

Methods and systems are described for obtaining eye measurements by generating a data-sampling clock and a variable-phase-offset eye-measurement clock with a local oscillator and an adjustable phase interpolator, using said sampling clock with a data sampler to obtain a receive sample of a received data signal, using at least one eye sampler and the variable-phase-offset eye-measurement clock to obtain a plurality of eye characteristic measurements by adjusting a voltage offset of the at least one eye sampler and a phase offset of the variable-phase-offset eye-measurement clock, and adjusting the displayed characteristics of the obtained eye measurements utilizing independently obtained correction information derived from measurements of DFE-corrected and uncorrected received data statistics.

DETAILED DESCRIPTION

Figure 1:
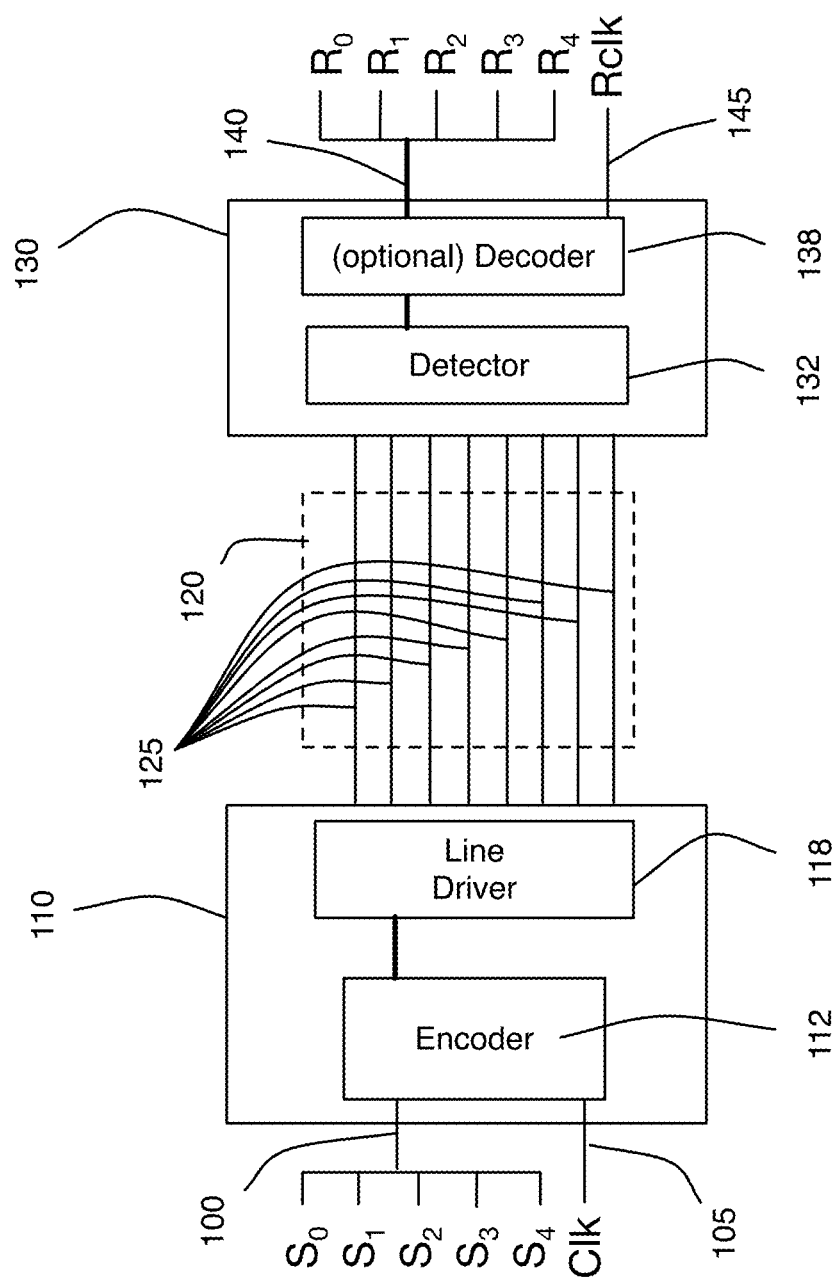
FIG. 1 is a block diagram of a system capable of encoding and transmitting five data bits and a clock on an eight wire communications channel.

As described in [Cronie I], vector signaling codes may be used to produce extremely high bandwidth data communications links, such as between two integrated circuit devices in a system. As illustrated by the embodiment of FIG. 1, multiple data communications channels transmit symbols of the vector signaling code, acting together to communicate codewords of the vector signaling code. Depending on the particular vector signaling code used, the number of channels comprising a communications link may range from two to eight or more, and may also communicate one or more clock signals on separate communications channels or as sub-channel components of the vector signaling code. In the example of FIG. 1, communication link 120 is illustrated as being composed of eight wires 125, collectively communicating five data values 100 and one clock 105 between transmitter 110 and receiver 130.

Some embodiments additionally support additional modes of operation in which, as one example, some number of data communications channels are reconfigured to support legacy communications protocols such as non-return-to-zero (NRZ) differential signaling.

Receiver Data Detection

Figure 2:
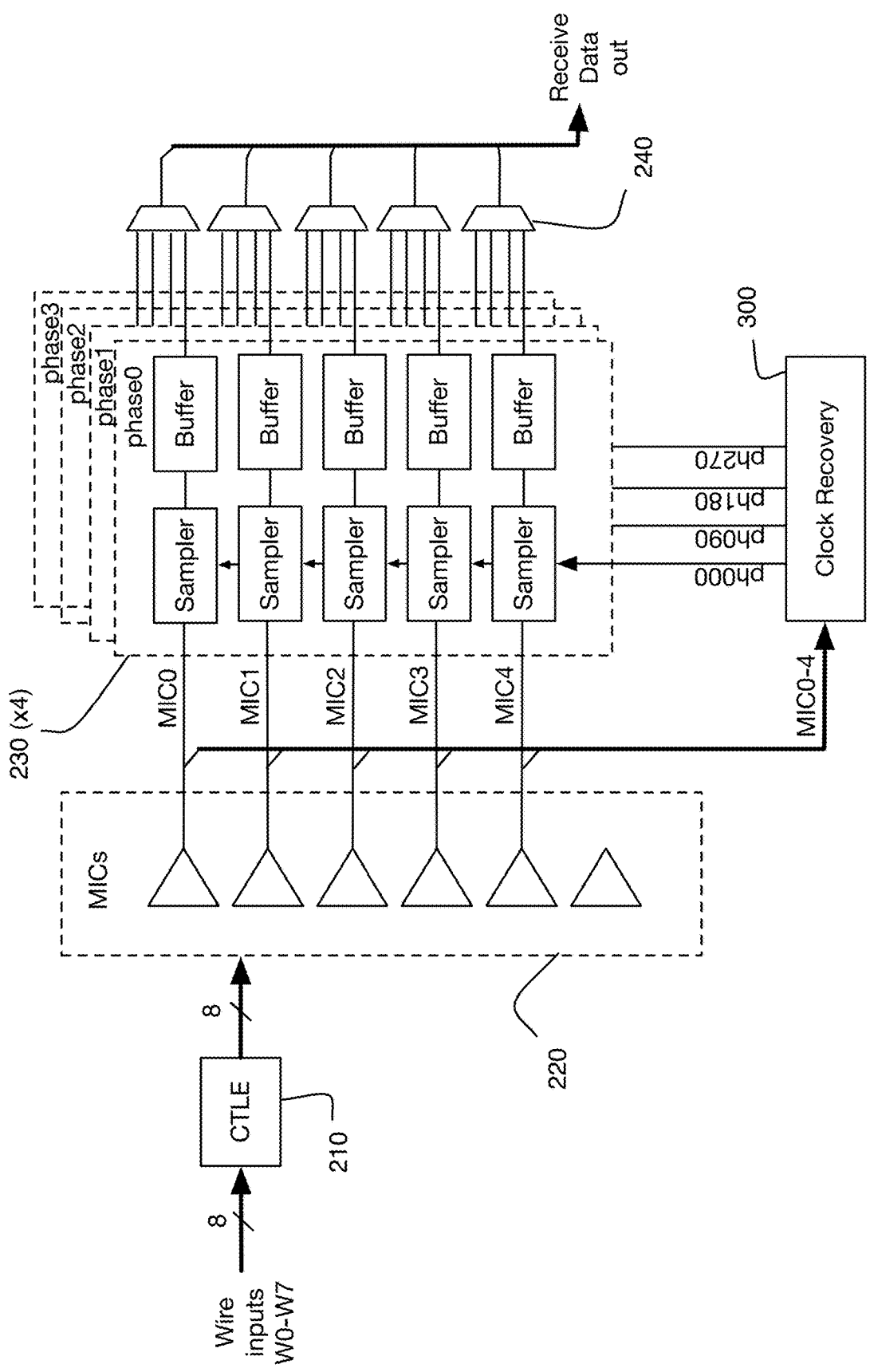
FIG. 2 is a block diagram of one embodiment of a receiver compatible with the system of FIG. 1.

To provide context for the following examples, one typical high-speed receiver embodiment [Stewart I] is used for illustrative purposes, without limitation. As illustrated in FIG. 2, the example data receiver includes eight identical Continuous Time Linear Equalization (CTLE) stages 210 operating on the signals received on the eight wires, previously shown as 120 in FIG. 1.

As described in [Holden I], vector signaling codes may be efficiently detected by linearly combining sets of input signals using Multi-Input comparators or mixers (MIC). For the 5b6w code used by the example receiver, five such MICs acting on weighted subsets of the six received data input signals will detect the five data bits without need of further decoding. In one embodiment, one additional MIC acting on combinations of the two received clock signals will similarly detect the clock signal.

Other embodiments may forgo the dedicated wires used to communicate a separate clock signal, and instead may extract a clock from transitions occurring on the data lines themselves. FIG. 2 illustrates a set of five MIC mixers 220 operate on the received and equalized signals to produce detected signals MIC0-MIC4, with transitions on those data lines collectively used to synchronize a local clock generator 300.

Because of the high data rates involved, multiple parallel phases of receive processing are shown in the example receiver. In the illustrated example, the five detected data signals MIC0-MIC4 are processed in four parallel phases of receive data processing, each phase 230 including data sampling and subsequent buffering, followed by optional recombination of the four phase outputs into a single received data stream, shown in FIG. 2 as being performed by multiplexers 240.

Clock Recovery circuits (also known in the art as Clock Data Recovery or CDR) support such sampling measurements by extracting timing information, either from the data lines themselves or from dedicated clock signal inputs, and utilize that extracted information to generate clock signals to control the time interval used by the data line sampling device(s). The actual clock extraction may be performed using well known circuits such as a Phase Locked Loop (PLL) or Delay Locked Loop (DLL), which in their operation may also generate higher frequency internal clocks, multiple clock phases, etc. in support of receiver operation. In the embodiment of FIG. 2, the detected clock signal is obtained from data transitions on MIC0-MIC4 and processed 300 to extract properly timed sampling clocks for the four data phases.

Decision Feedback Equalization or DFE is one well known technique used to compensate for the effects of ISI. A receiver maintains a history of previously received data values, and uses an internal model or estimation of network characteristics to compute the ISI effects those previous data values would produce on such a network. This estimation, known as the DFE correction, may then be applied to the currently received signal prior to data sampling, improving received signal quality. In some embodiments, all of the necessary previous data values may not be fully resolved at the time that the DFE correction must be applied to the immediate received signal. In these cases, so called "loop unrolled" or "speculative" DFE may be performed, wherein one or more DFE terms are applied in anticipation that the previous data was a '1' and that it was a '0'. These tentative results are retained until the previous data value is known, at which time the proper result is chosen for subsequent use.

Additional details of clock extraction and DFE correction may be found in [Stewart I].

Obtaining Eye Diagram Measurements

In at least one embodiment, individual clock source selections may be made for the samplers associated with data and clock edge detection, and with auxiliary functions such as gathering statistical eye graph data and calibration. In such embodiments, clock source selections may include an unmodified clock provided by the Receiver Clock System, an incrementally delayed clock provided by a configurable delay element, and/or a separately phase adjustable clock used for statistical eye graph sampling.

The value of such "eye diagram" measurements is well understood in the art, providing an easily-understood presentation of multiple receiver characteristics, including receive signal amplitude margin, timing margin, and error counts. Other characteristics, including bandwidth, equalization, system gain, etc. may also be inferred. Such data may suggest or initiate system adjustments or controls, including transmit power adjustment, receiver gain adjustment, baud rate adjustment, and receive equalization adjustment.

Figure 3:
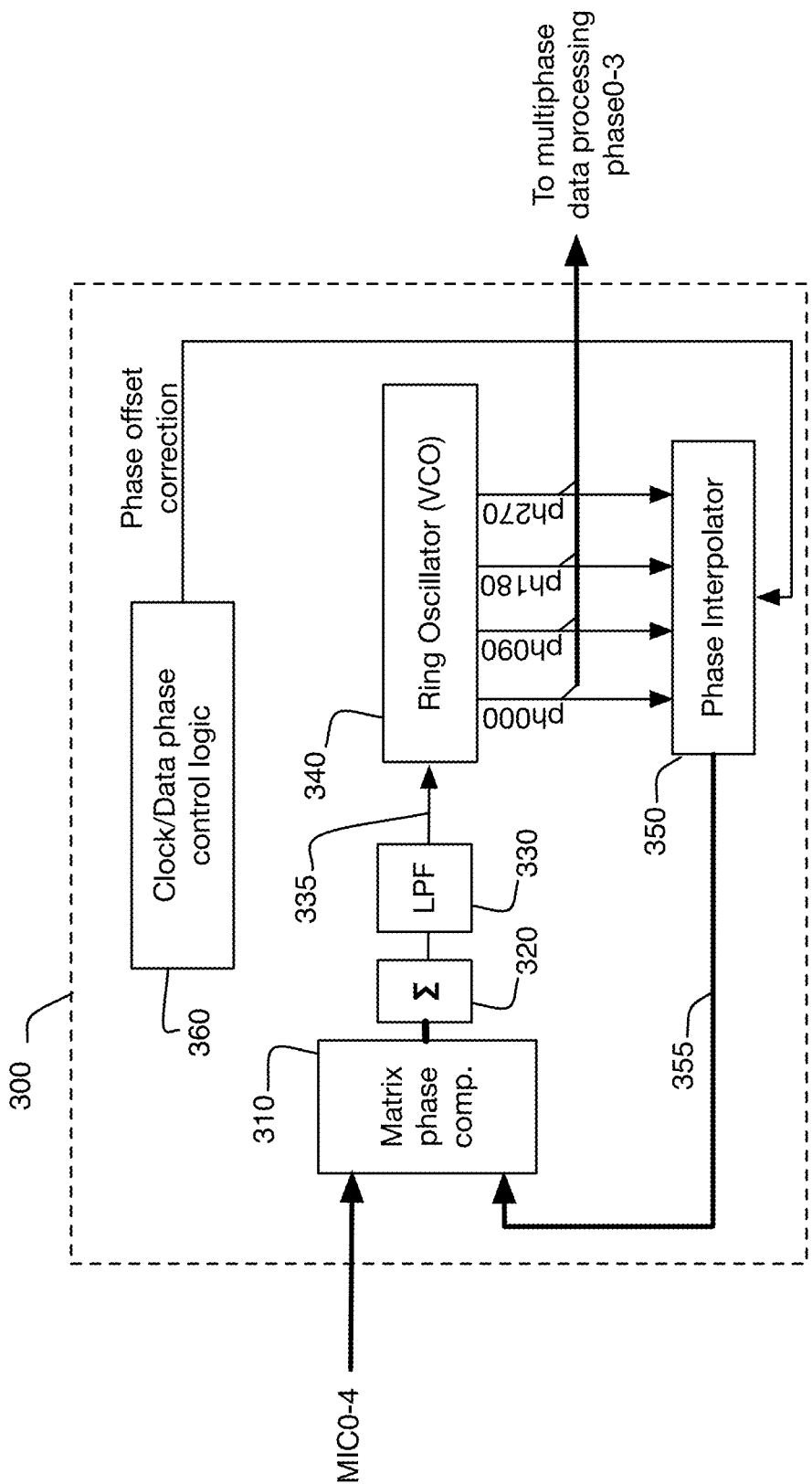
FIG. 3 is a block diagram detailing one embodiment of the clock recovery circuit used by the receiver of FIG. 2.
Figure 4:
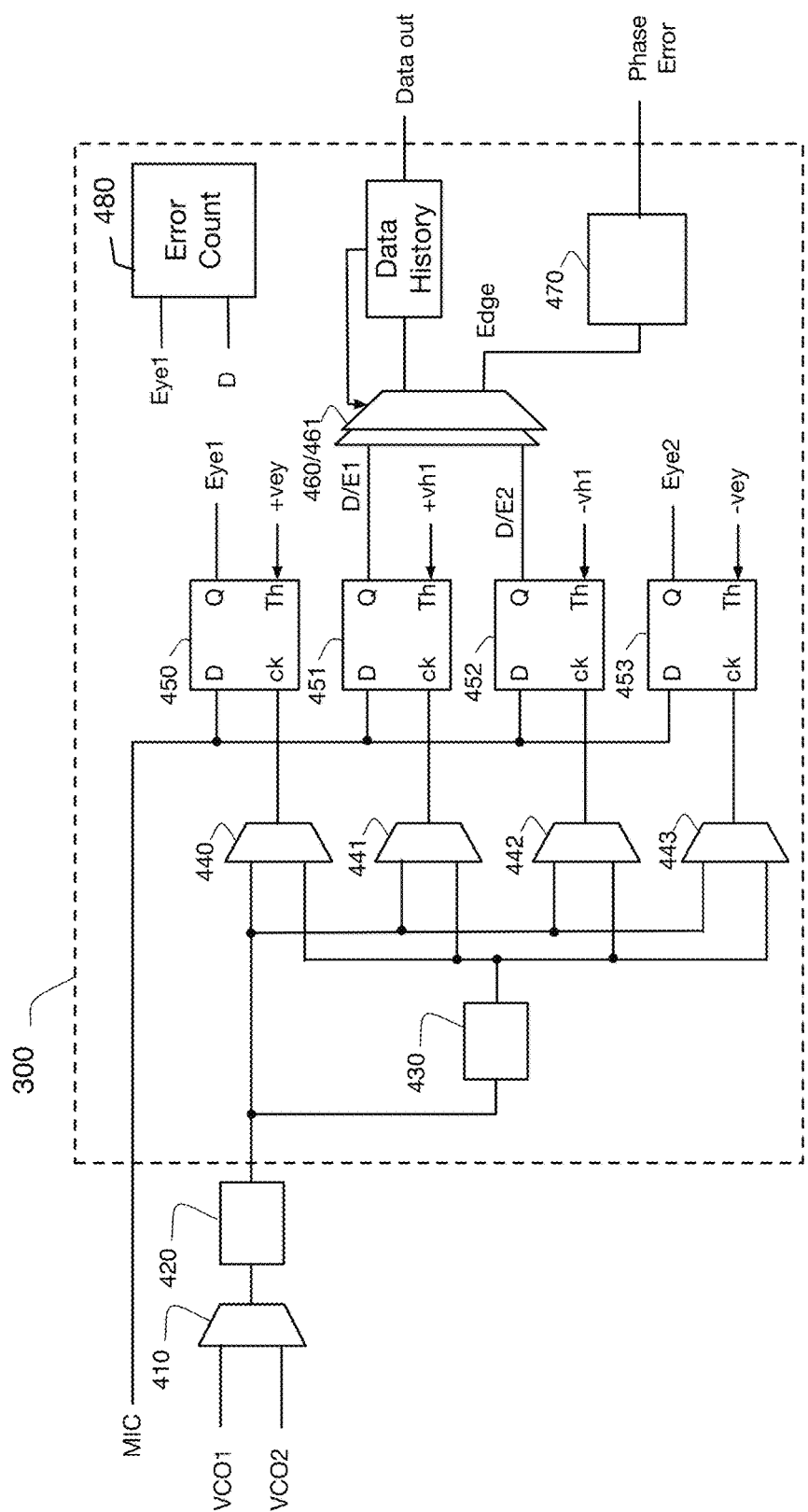
FIG. 4 details one embodiment of a receive processing phase.

FIG. 4 illustrates these components combined in one embodiment of a processing phase 300, as previously described in relation to FIG. 3. A sampling clock produced by VCO1 or VCO2 may be selected by multiplexer 410, and optionally delayed by adjustable delay buffer 420. The previously-described data sampling function is shown in this embodiment as four clocked samplers including eye sampler 450 and 453 and data samplers 451 and 452. In one embodiment, the samplers are clocked analog integrate-and-hold elements, although no limitation is implied as known art sample-and-hold, track-and-hold, clocked comparator, and other comparable circuits are equally applicable.

Each sampler accepts an input data signal at D, and compares the state of D relative to an offset voltage threshold Th at a sampling instant determined by a clock signal ck with the sliced decision available at output Q. In some embodiments, the input data signal may correspond to the output of a MIC, or alternatively the input data signal may be a differential signal detected using a differential comparator. No limitation is implied, as the techniques described below are functional for a variety of data transmission schemes. Data samplers 451 and 452 are provided with speculative DFE correction values +vh1 and −vh1, corresponding to previous data values '1' and '0' respectively to generate a sequence of data decisions. One of results D/E1 and D/E2 will be chosen by multiplexer 460 as received data decision, with the other result (a potential edge transition) optionally also directed by multiplexer 461 to Phase Comparator/Charge Pump 470 to produce a Phase Error signal for the PLL.

A comparable multiplexer to that illustrated as 460 selects between decisions Eye1 and Eye2 from eye samplers 450 and 453 based on the previous received data value, to obtain a measurement result for generation of a statistical eye diagram corresponding to amplitude thresholds +vey, −vey and the timing offset provided by adjustable delay buffer 430.

In an alternative embodiment, phase interpolators may be used instead of adjustable delay buffers. Thus, as one example, 430 is a phase interpolator producing a variable-phase-offset clock which eye samplers 450 and 453 may use for eye measurement.

In a further embodiment, a single eye sampler may be used, generating a decision that may be retained or discarded depending on the eventual resolution of the previous data value. In some embodiments, decisions of the Eye sampler are compared to the (eventually) determined data decisions from the data sampler, with an error count of incorrect results being retained. Such an error count may be retained over a plurality of measuring points, each measuring point defined by a respective sampling instant of a plurality of sampling instants and a respective voltage offset of a plurality of voltage offsets. In yet another embodiment, each error count may be pattern-specific, e.g., counts of errors in received ones (i.e. eye sampler detection of a zero when a data one was actually received) and received zeroes (i.e. eye sampler detection of a data one when a data zero was actually received) are maintained. Such error counts may be output and used to develop bit error rates (BER). Typically, such BER information may be measured by analyzing each error count over increments of thousand, million, billion, etc. received values.

Figure 17:
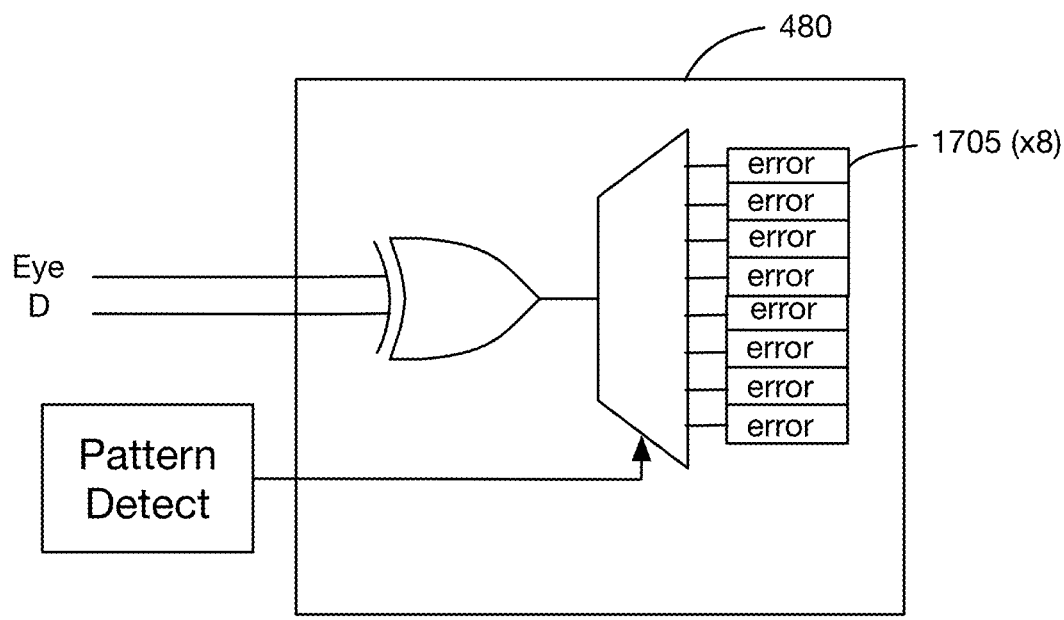
FIG. 17 is a block diagram of an error count circuit, in accordance with some embodiments.
Figure 19:
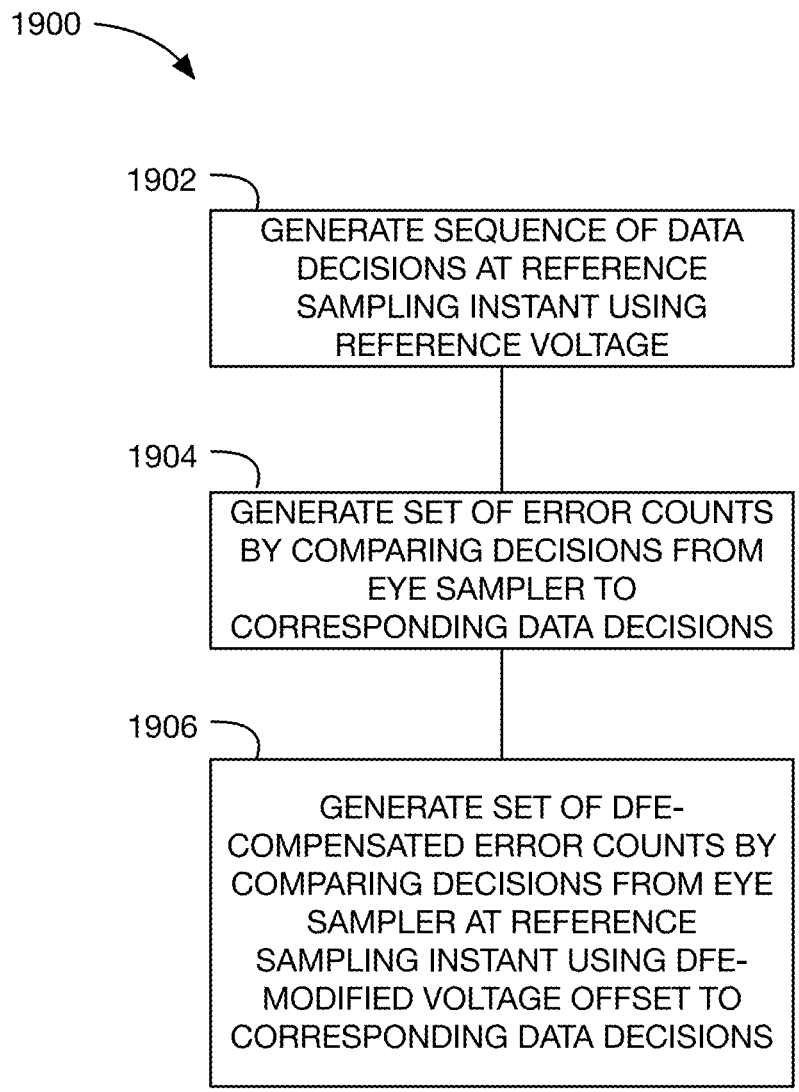
FIG. 19 is a flow diagram of a method 1900, in accordance with some embodiments.

FIG. 19 is a flow diagram of a method 1900, in accordance with some embodiments. As shown, method 1900 includes generating 1902, using a data sampler 451/452, a sequence of data decisions D at a reference sampling instant using a reference voltage. As shown in FIG. 4, the reference voltage may be a speculative DFE offset, and the data decision is subsequently selected according to a previous bit, however a data sampler utilizing a fixed reference voltage may also be used. In still further embodiments, the data decisions may be determined according to a known or otherwise predetermined data pattern, rather than from actual received data processed via a data slicer. Method 1900 further includes generating 1904 a set of error counts, each error count generated by comparing decisions, e.g., eye 1, from an eye sampler 450 formed at a respective sampling instant of a plurality of sampling instants using a respective voltage offset +vey of a plurality of voltage offsets to corresponding data decisions D of the sequence of data decisions generated by data samplers 451, 452. Error counts may be generated at a set of measurement points, where each measurement point is defined by the respective sampling instant and the respective voltage offset. At each measurement point, thousands, millions, billions, etc. of decisions generated by eye sampler 450 may be provided to error count 480 along with corresponding resolved data decisions of the sequence of data decisions that are made in the same sampling interval. The decision of eye sampler 450 and the resolved data decision may be compared to see if they are the same (no error) or if they are different (error). Error count circuit 480 may generate such comparisons may be done using e.g., a logical exclusive OR gate as shown in FIG. 17. Error counts may be determined across a plurality of different sampling instants and a plurality of different voltage thresholds to effectively provide a 2D map of error counts.

Figure 16:
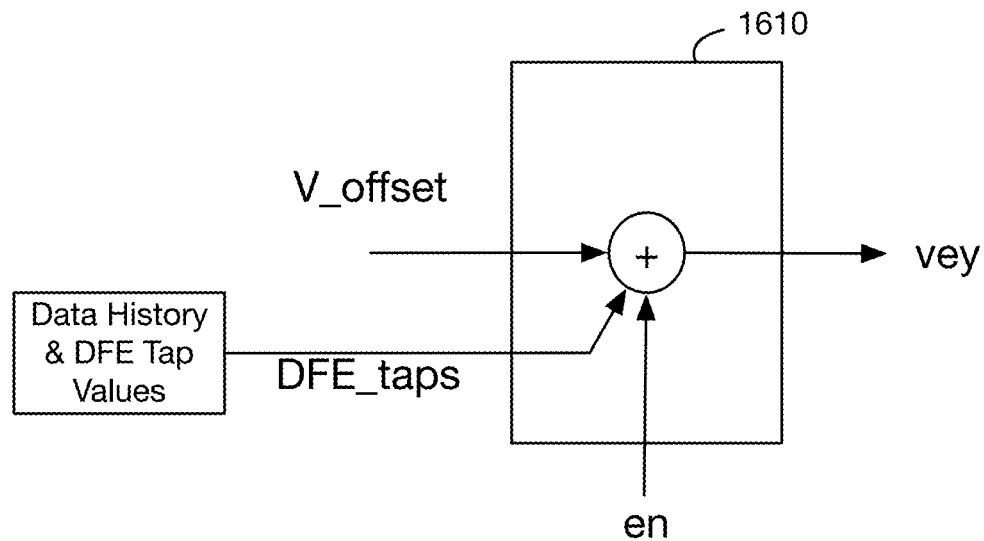
FIG. 16 is a block diagram of a DFE-offset voltage generator, in accordance with some embodiments.

The method 1900 further includes generating 1906 a set of DFE-compensated error counts. Each DFE-compensated error count may be similarly generated by comparing decisions from the eye sampler using a DFE-modified voltage offset to corresponding data decisions of the sequence of data decisions generated by the data sampler. The set of DFE-compensated error counts are generated based on decisions formed at the reference sampling instant used to sample data, e.g., near the center of the eye. In some embodiments, the DFE-modified offset voltage corresponds to a voltage offset that is dynamically modified according to a set of DFE-correction values. While the voltage offset associated with the given measuring point may remain constant, the DFE-modified offset voltage for which the decision is ultimately made may dynamically shift according to the set of DFE-correction values. In some embodiments, the method further includes generating the DFE-modified voltage offset by selectively applying historical DFE correction factors to a respective voltage offset of the plurality of voltage offsets at the eye sampler. In some embodiments, a DFE-offset voltage generator 1610 as shown in FIG. 16 may be configured to generate an analog summation of the voltage offset 'V_offset' with the set of historical DFE-correction factors 'DFE_taps'. In some embodiments, the offset voltage 'V_offset' may be provided off-chip as a parameter while the DFE-correction factor 'DFE_taps' may be generated on-chip using data history and predetermined DFE tap values that are determined e.g., by measuring ISI characteristics of the channel. Each DFE tap value may be a constant value that has a sign applied to it by a corresponding historical data bit. In some embodiments, the immediately prior DFE correction factor may be included either directly if it is available, or, provided speculatively. Furthermore, pattern filtering may be applied to effectively apply the immediately prior DFE correction factor. Further shown in FIG. 16 is an enable signal 'en' configured to selectively apply the DFE_taps when generating the DFE-compensated error counts. In some embodiments, when generating the uncorrected error counts, the DFE-offset voltage generator may simply pass the offset voltage V_offset to the eye sampler. Other switching circuits/multiplexing circuits may be used as well.

Figure 18:
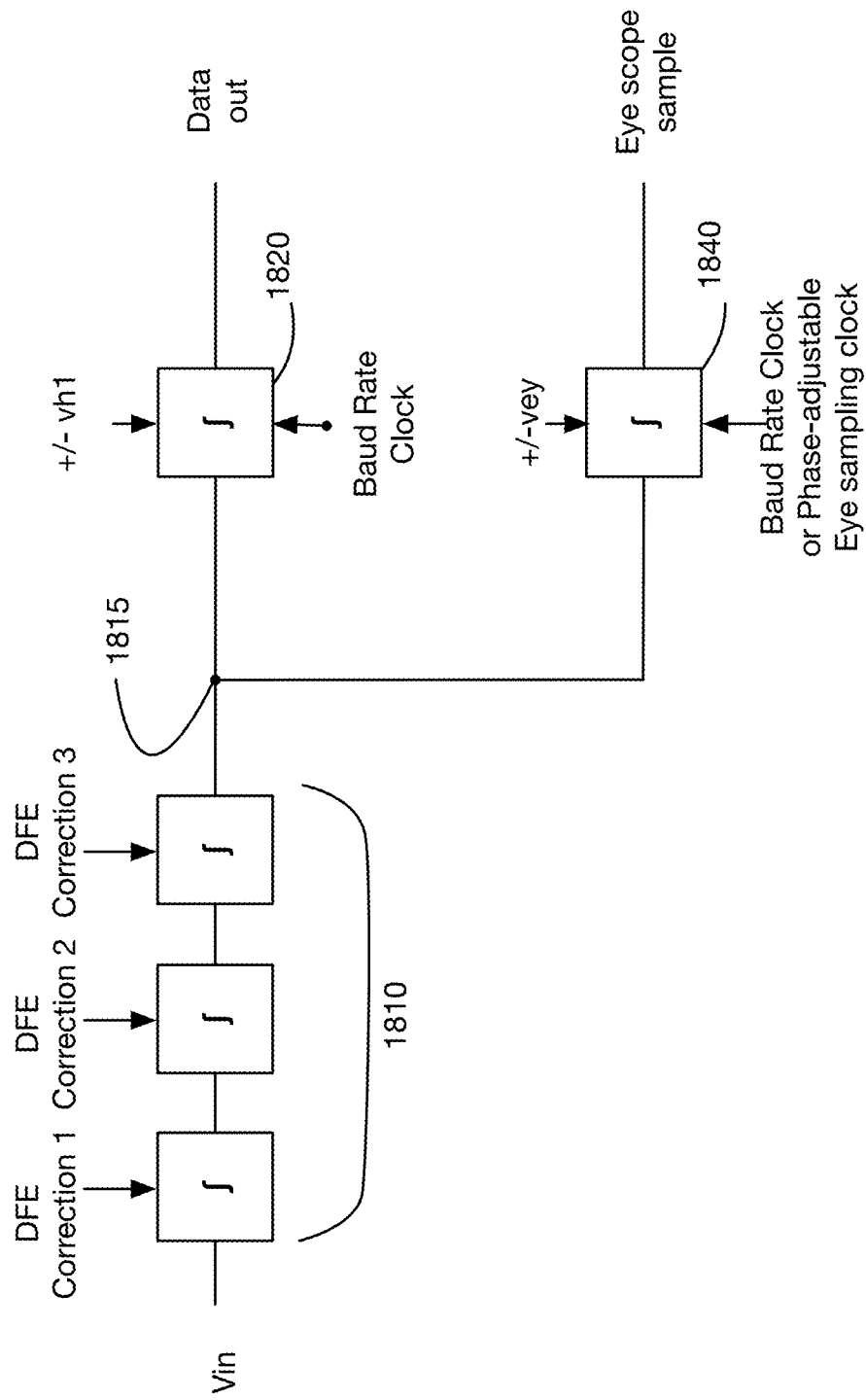
FIG. 18 is a block diagram of a cascaded sampler for introducing DFE correction into the received data signal, in accordance with some embodiments.

Alternatively, the DFE-correction values may be applied directly to the received data signal. Such an embodiment is illustrated in FIG. 18, where a cascaded integrate-and-hold sampler structure applies three historical DFE-correction values via integration stages 1810, and the DFE-corrected data signal is applied directly to the data sampler 1820 and the eye sampler 1840.

In some embodiments, each error count of the set of error counts and each DFE-compensated error count of the set of DFE-compensated error counts are stored in a respective counter (which may also be referred to as a register, and which may be accessible to an input/output circuit of a circuit die, or chip, to allow such values to be read by external test equipment). As shown in FIG. 17, blocks 1705 may correspond to counters for storing each error count and DFE-compensated error count. In some embodiments, each error count of the set of error counts and each DFE-compensated error count of the set of DFE-compensated error counts are further generated responsive to detection of a respective data pattern. In the example of FIG. 17, each block 1705 may be an error count associated with a respective data pattern and may be updated with the result of the comparison of decision 'Eye' received from the eye sampler to data decision 'D' received from the data sampler. Such data patterns may be e.g., triplet data patterns, such as '011' or '101'. In some embodiments, the set of error counts and set of DFE-compensated error counts are generated using at least one logical XOR gate connected to an output of the eye sampler and an output of the data sampler, as shown in FIG. 17.

Figure 5:
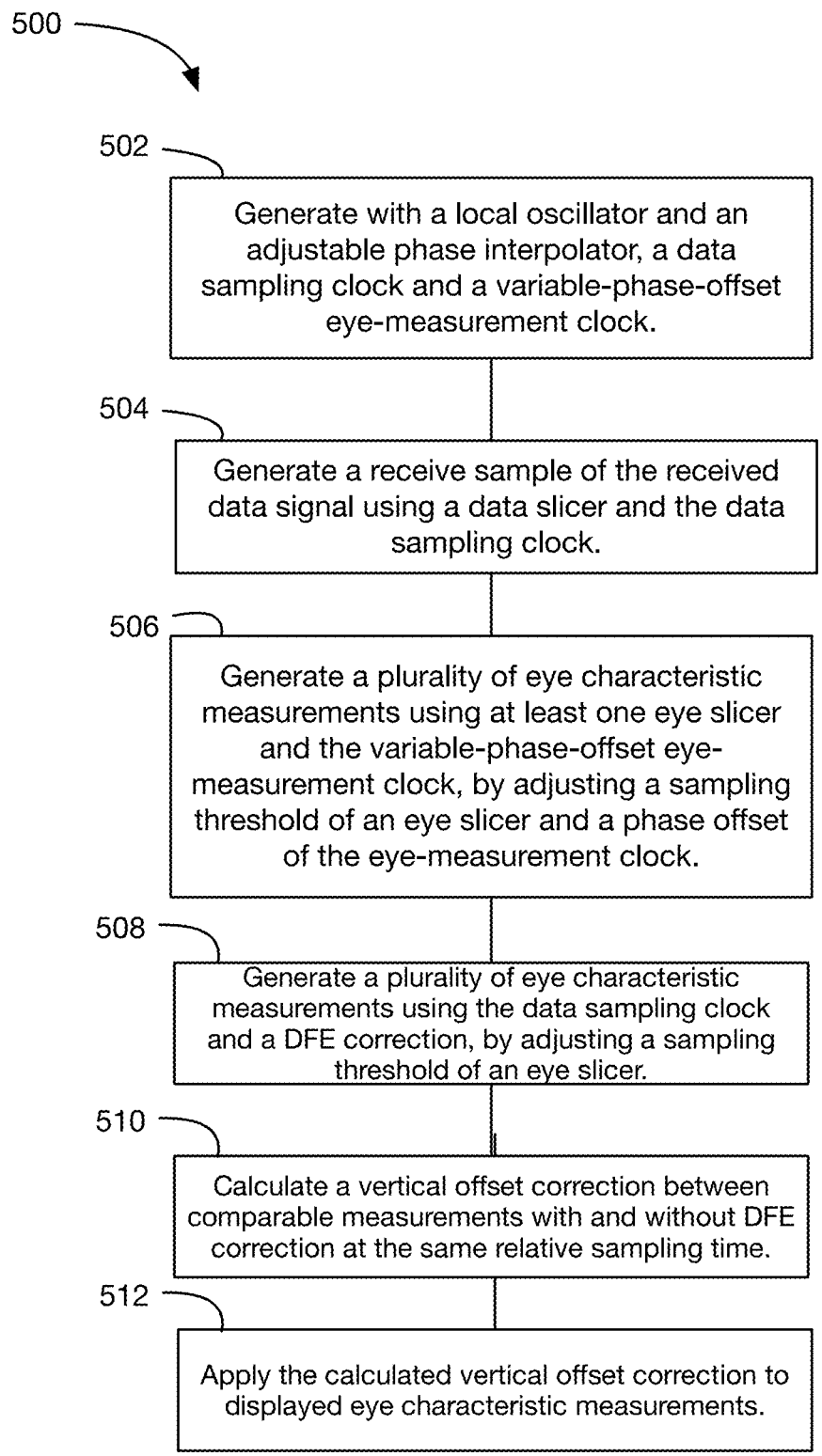
FIG. 5 is a flowchart of a method, in accordance with some embodiments.

FIG. 5 is a flowchart of a method 500, in accordance with some embodiments. As shown, method 500 includes generating 502, with a local oscillator and an adjustable phase interpolator, a data sampling clock and a variable-phase-offset eye measurement clock, generating 504 a sequence of data decisions by sampling the received data signal at a reference sampling instant at a reference voltage offset using a data sampler and the data sampling clock. The method includes generating 506 a plurality of eye characteristic measurements using at least one eye slicer and the variable-phase-offset eye measurement clock, by adjusting a sampling threshold of an eye slicer and a phase offset of the eye-measurement clock. The method further includes generating 508 a plurality of eye characteristic measurements using the data sampling clock and a DFE correction, by adjusting a sampling threshold of an eye sampler, and calculating 510 a vertical offset correction between comparable measurements with and without DFE correction at the reference sampling instant, and applying 512 the calculated vertical offset correction to displayed eye characteristic measurements.

Figure 6:
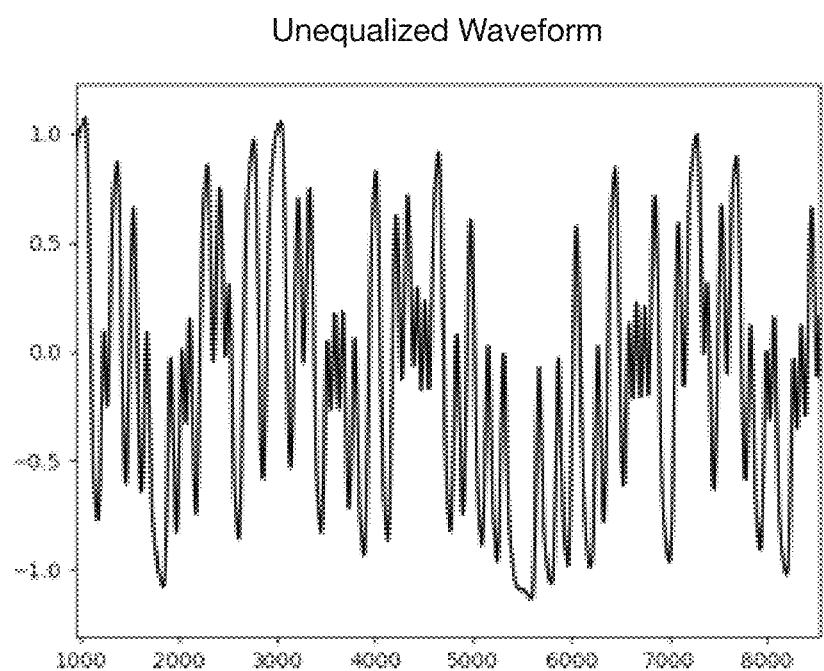
FIG. 6 shows an unequalized waveform of a data signal, in accordance with some embodiments.
Figure 7:
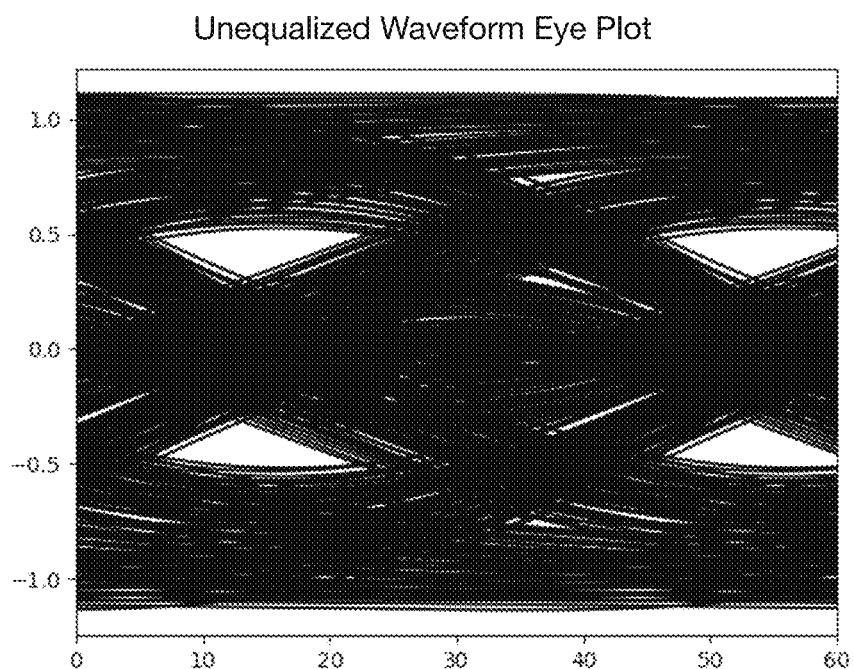
FIG. 7 is an eye diagram of the unequalized data signal, in accordance with some embodiments.
Figure 8:
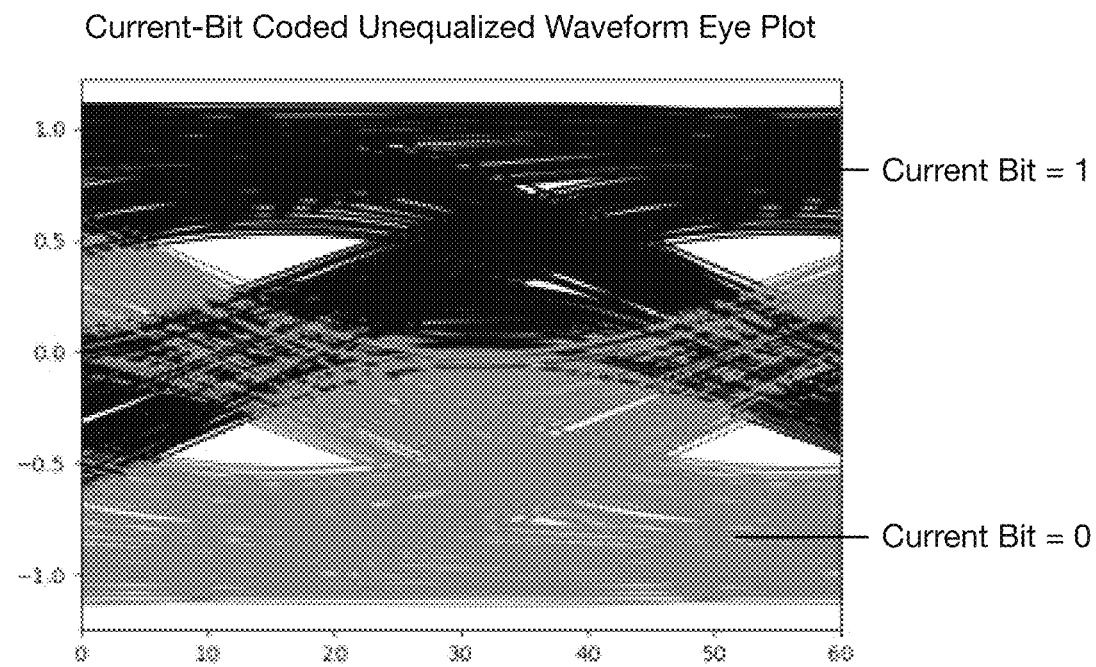
FIG. 8 is a color-coded version of the eye diagram of FIG. 7, illustrating portions of the eye diagram for which the current bit is a '1' and the current bit is a '0'.
Figure 9:
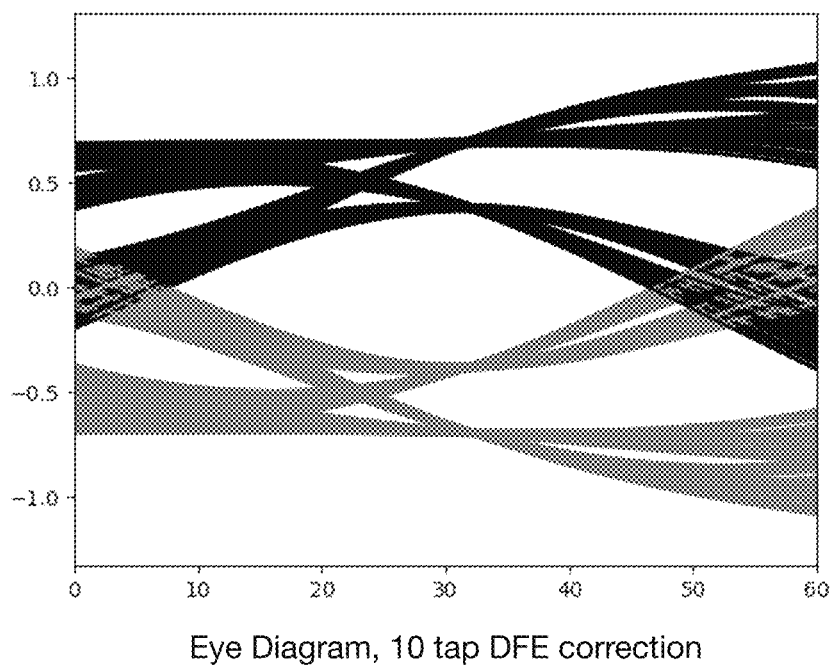
FIG. 9 is an eye diagram formed using e.g., the waveform of FIG. 7 and applying decision feedback equalization (DFE) correction, in accordance with some embodiments.
Figure 12:
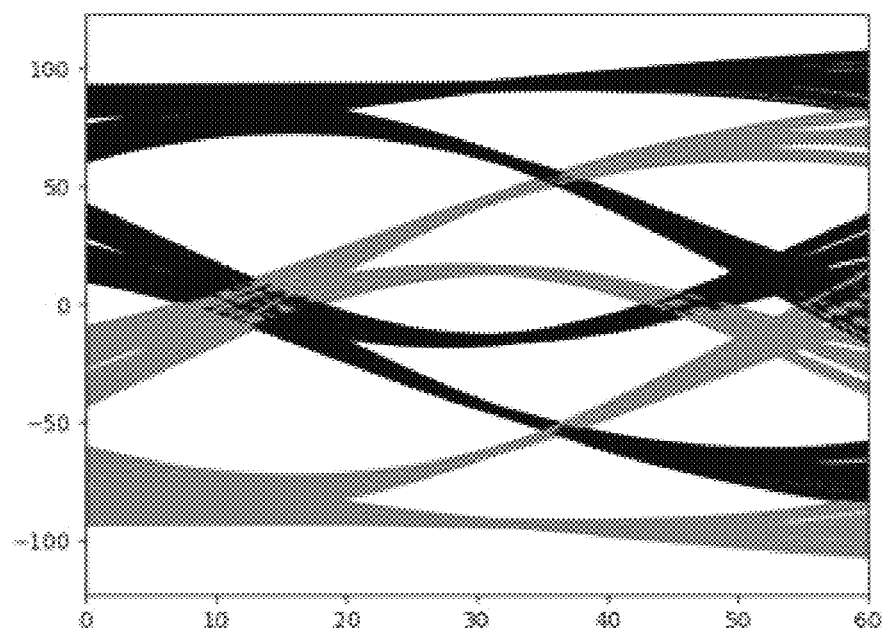
FIG. 12 is an eye diagram that is equalized using a set of historical DFE correction factors except for the immediate prior history bit.

In another embodiment, a sweep may be made over a predetermined range of voltage offsets and over a predetermined range sampling instants, recording the measurement results for each such combination. In this example, these measurements will be performed on the unequalized waveform shown in FIG. 6, without benefit of DFE correction, resulting in the uncorrected eye diagram as shown in FIG. 7. In some embodiments, error counts are generated that are associated with two different data patterns (i.e. the rate of errors seen at that measurement point in which a zero is detected instead of a transmitted one, and in which a one is detected instead of a transmitted zero, respectively). The waveform of FIG. 8 illustrates a color-coded eye diagram illustrating when resolved data decision of the current bit is a '1' (the black portion) and when the resolved data decision of the current bit is a '0' (the grey portion). In some embodiments, the recorded error counts may be maintained as a table or other comparable data structure. It should be noted that simple display of this non-DFE corrected information may not accurately represent behavior of a DFE-corrected data detection condition. Below, methods and systems are described for generating sets of error counts and sets of DFE-compensated error counts, as well as how such error counts may be utilized to modify non-DFE corrected measurements to produce a DFE-corrected eye diagram as shown in FIG. 9. In some embodiments, the most immediate previous data bit may have not yet been resolved. In such embodiments, DFE-correction may still be performed for a set of taps excluding the DFE correction factor for the most immediate previous unit interval (referred to herein as "h1"). A DFE-corrected eye diagram of such a scenario is shown in FIG. 12.

Figure 10:
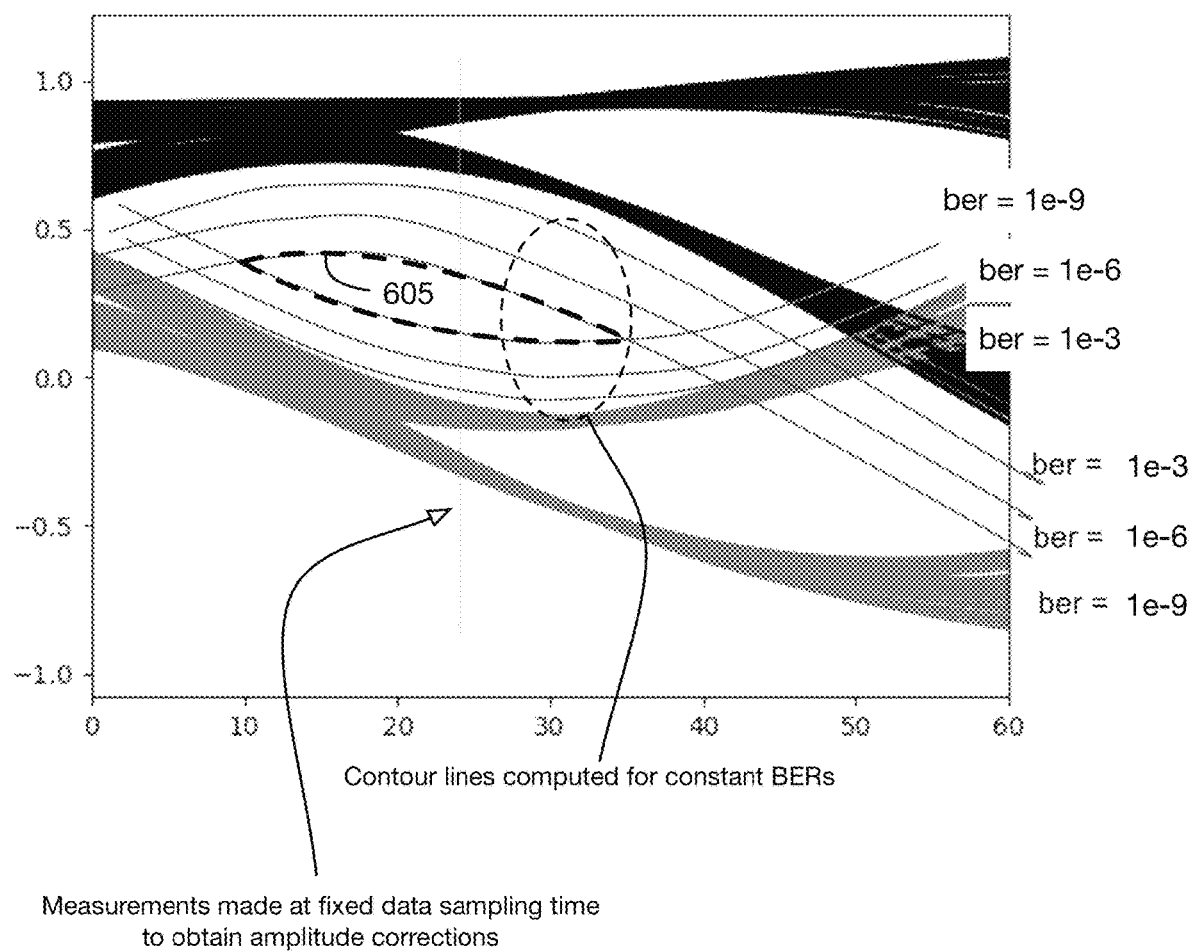
FIG. 10 shows measured eye information processed to obtain contour lines of constant Bit Error Rate (BER).
Figure 11:
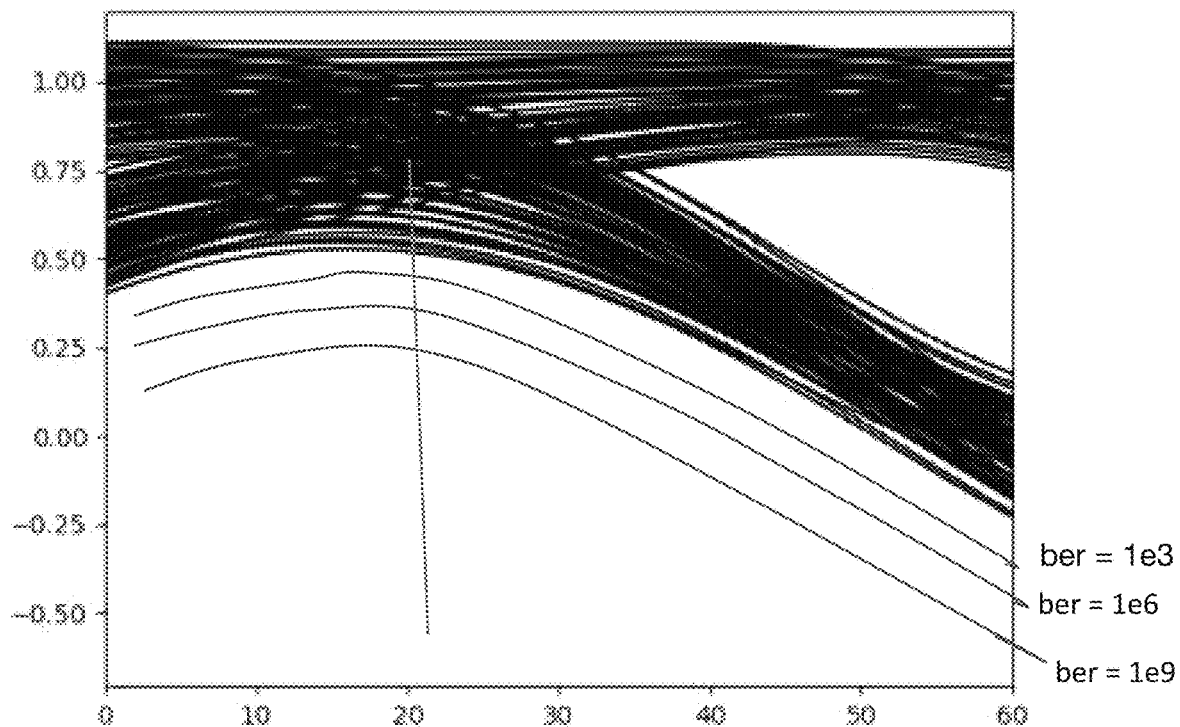
FIG. 11 illustrates BER contour lines for different transition patterns for 1-to-1 transitions (top) and 1-to-0 transitions (bottom), in accordance with some embodiments.
Figure 11:
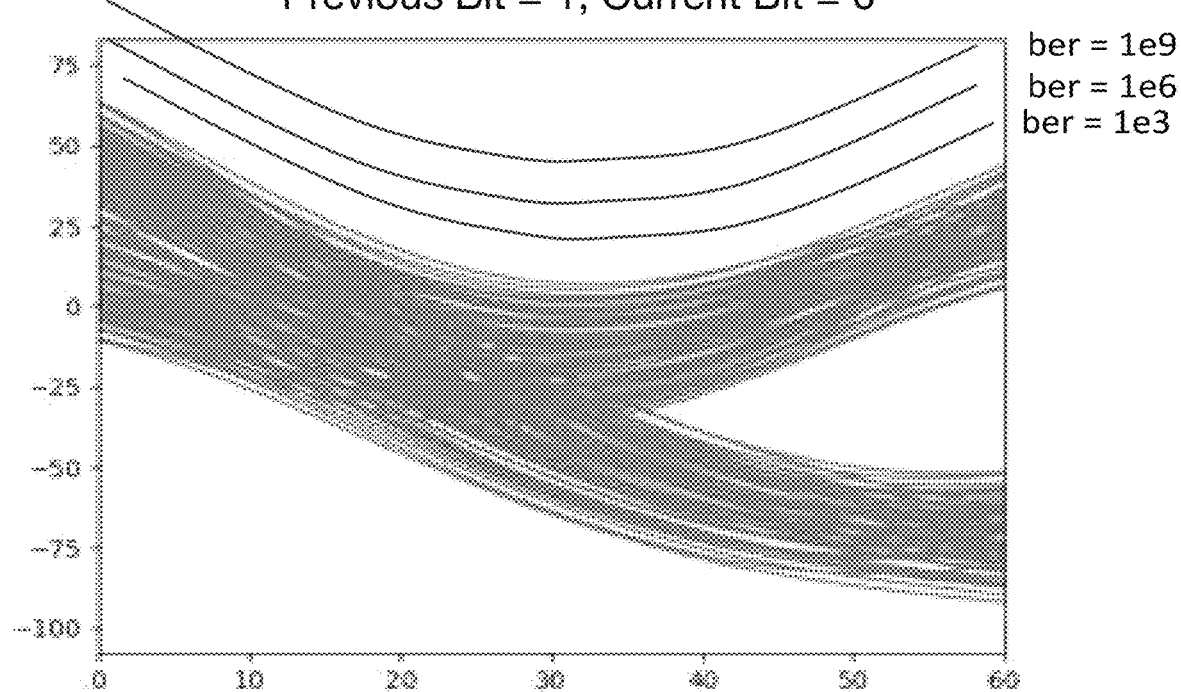

To facilitate subsequent explanations, an embodiment is assumed in which error counts and DFE-compensated error counts are further processed into "contour lines" of points having an equal BER. Such processing may occur off-chip, by e.g., a diagnostic tool. Each BER contour line spans a range of voltage offsets and sampling instants, as shown in FIG. 10. Thus, as one example, the contour line representing a BER for received '1' errors of $10^{-9}$ (i.e. one error in $10^9$ received bits) may correspond to the generally-accepted innermost "upper edge" of an open eye, and the comparable contour line for received '0' errors may correspond to the generally accepted innermost "lower edge" of the open eye. As this information was obtained without DFE correction, the resulting "eye opening" 605 will be small, and indeed may not exist at all. That is, a contour line corresponding to a particular BER for '1' data values may be lower than the contour line corresponding to the same BER for a '0' data value, as illustrated by e.g., the external portions of the 1e-9 BER contour lines to the left and right of the intersections of the internal portions 1e-9 BER contour lines that form the eye opening 605. In some embodiments, BER contours may be associated with data patterns. FIG. 11 illustrates BER contours for two different data patterns, in accordance with some embodiments. The top waveform illustrates identified BER contours for a 1-to-1 data pattern, while the bottom waveform illustrates identified BER contours for a 1-to-0 data pattern. The BER contours of FIG. 11 may be combined to form the eye-openings for certain BERs as shown in FIG. 10.

Figure 13:
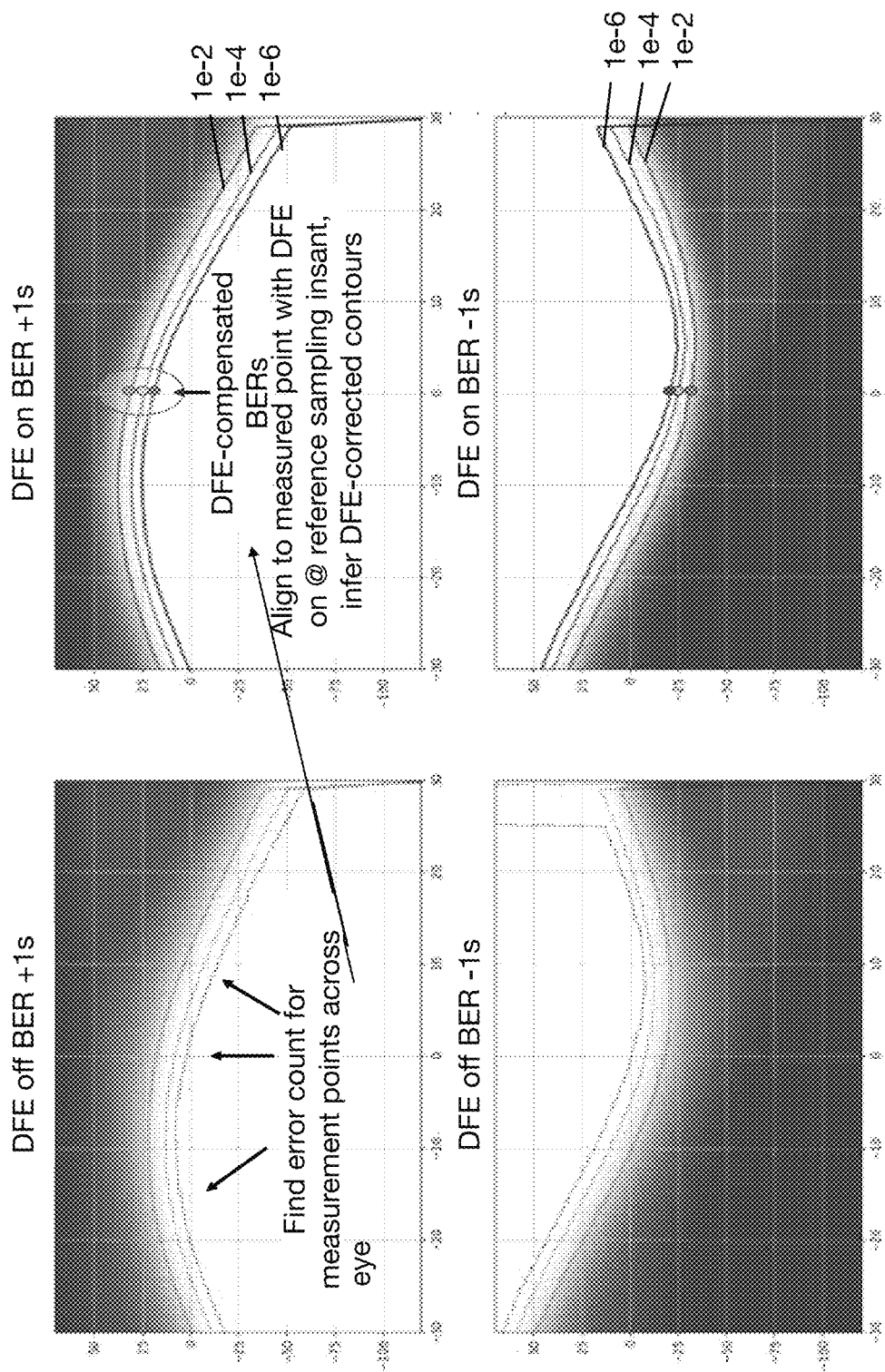
FIG. 13 is a set of plots illustrating BER's with and without DFE correction for current bit equaling '1' and '0'.

In some embodiments, a method includes obtaining a set of error counts for non-DFE corrected data, and responsively identifying non-corrected BER contours based on the obtained set of error counts. The top-left diagram of FIG. 13 illustrates BER contours without any DFE correction. The method further includes obtaining a set of DFE-compensated error counts that are made along the reference sampling instant and identifying DFE-compensated BERs shown as the three dots in the top-right diagram of FIG. 13. A DFE-compensation offset may be identified by comparing the voltage offset associated with a given DFE-compensated BER to the voltage offset associated with the same BER value of an uncorrected BER. Such DFE-compensation offsets may be identified for multiple BERs. Subsequently the uncorrected BER contours of the top-left diagram of FIG. 13 may be shifted upwards by the identified DFE-compensation offset. Similarly, the uncorrected BER contour lines of the bottom-left diagram of FIG. 13 may be shifted downwards based on the DFE-compensated BERs identified in the bottom-right diagram of FIG. 13.

Figure 14:
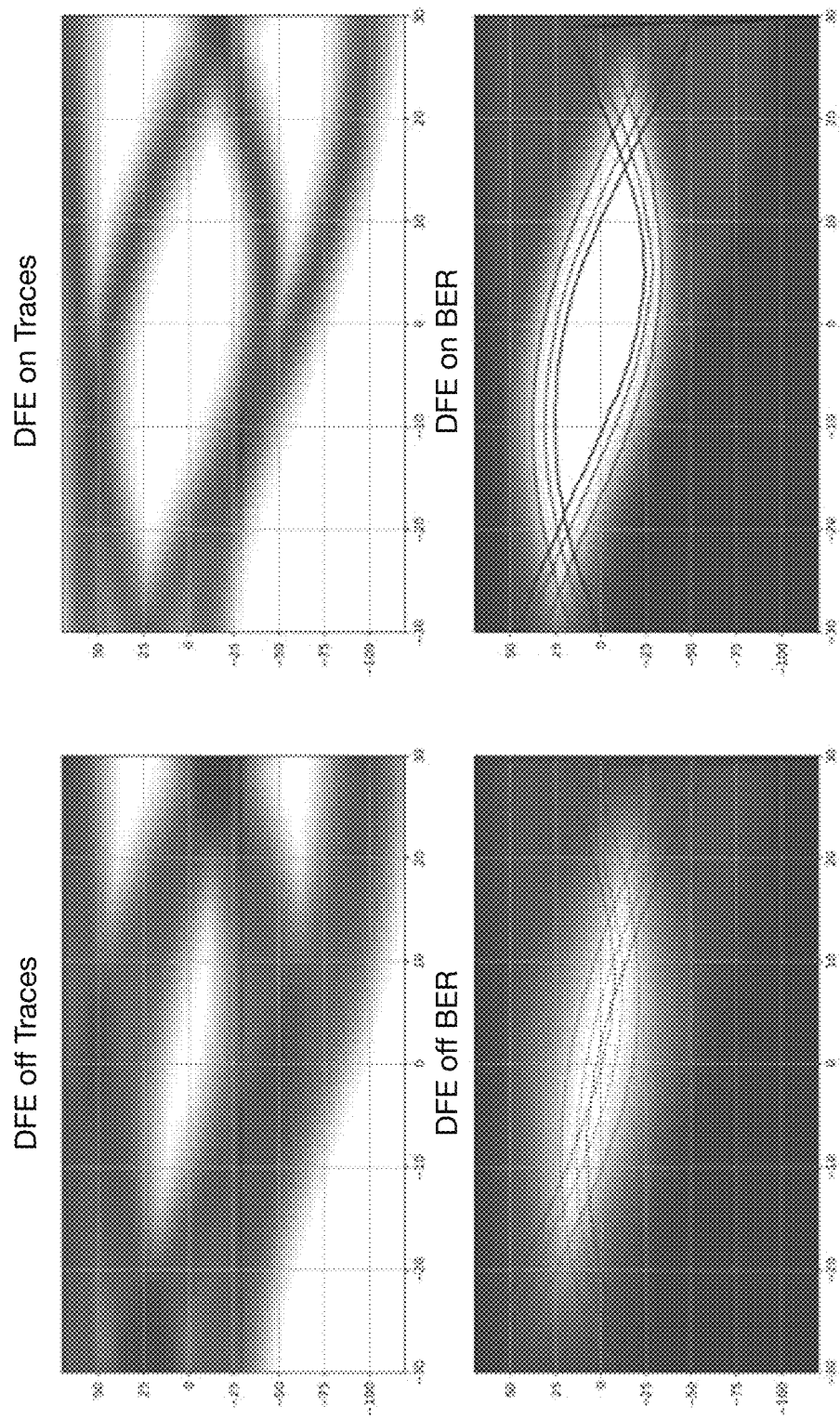
FIG. 14 is a set of plots illustrating trace waveforms with and without DFE (top) and BER contours with and without DFE (bottom).
Figure 15:
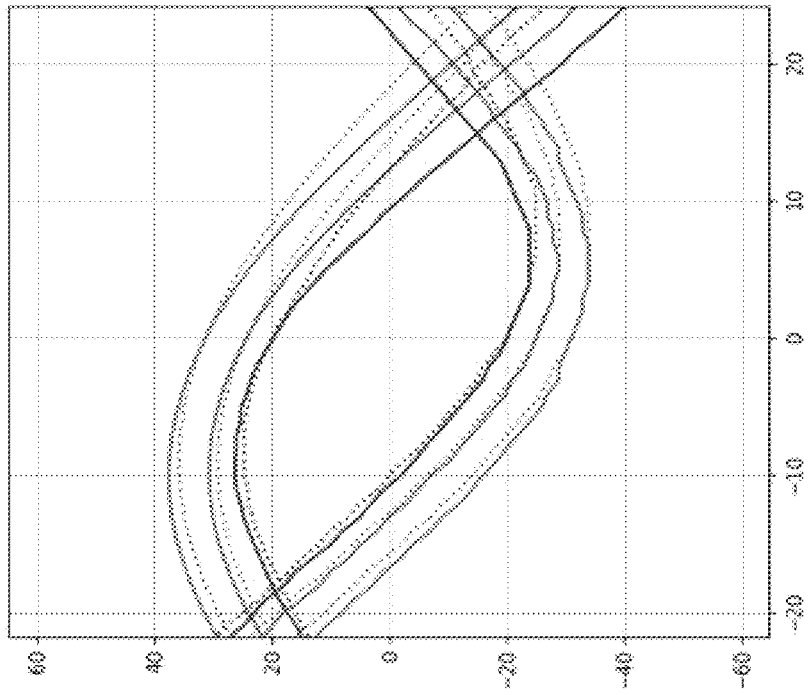
FIG. 15 is a plot of BER contours with and without DFE (left) and a plot of shifted uncorrected BER contours as determined by the DFE-compensation offset (right).
Figure 15:
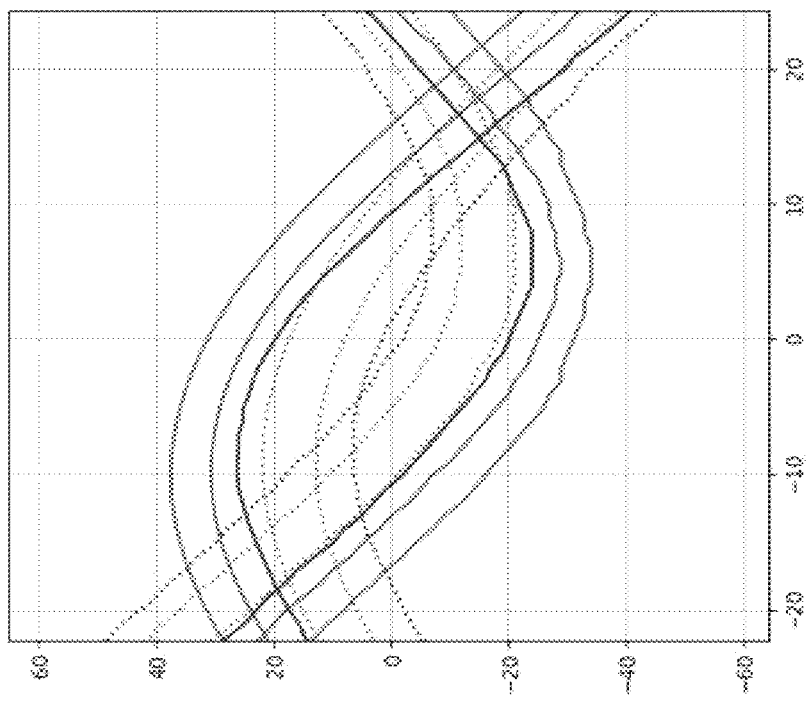

FIG. 14 illustrates eye diagrams of data signals on traces without and with DFE (top-left and top-right, respectively), and illustrates the adjustment of the uncorrected BER contour lines of the bottom-left diagram of FIG. 14 to form the DFE-compensated BER contour lines of the bottom-right diagram of FIG. 14. FIG. 15 similarly illustrates adjustment of uncorrected BER contour lines according to the DFE-compensation offset determined by the DFE-corrected BERs at the reference sampling instant.

To correct this condition, a scan is performed over a predetermined range of amplitude thresholds, but solely at the reference sampling instant corresponding to the normal data sampling time, which may be at a sampling instant near the center of the signaling interval. Because this reference sampling instant is fixed, DFE correction (both speculative and non-speculative) may be applied; as previously described speculative results may be obtained using a single sampler by discarding results where the anticipated correction did not match the actual data value subsequently detected. The amplitude thresholds so obtained correspond to particular errors versus counts of values received, each combination being associated with a BER; in embodiments maintaining separate one's errors and zero's errors, each combination may be associated with two BERs, one for each separate error count.

BERs for 1's and 0's are compared to those obtained at the reference sampling instant without DFE compensation, and the incremental amplitude difference between the DFE and non-DFE measurements are retained. Subsequently, a display processor may graphically synthesize a corrected eye diagram by plotting BER contour lines based on non-DFE measurements, using the amplitude correction determined to exist for that BER between non-DFE and DFE measurements. BER values may also be depicted according to a color or greyscale mapping of the values.

In a typical case, the amplitude corrections for 1's BER will result in the contours moving up (towards greater threshold values) and for 0's BER moving down (towards lesser threshold values). Similarly, in most cases the threshold differences between smaller and larger BER contours will decrease when such corrections are applied.

In some embodiments, the BER-specific correction values are obtained using BER data gathered from the received sets of error counts and DFE-compensated error counts obtained at the reference sampling instant (e.g., as determined by the timing obtained from the clock and data recovery circuit). A particular BER value (assuming some level of quantization/rounding) may occur in a non-DFE corrected signal when a corresponding particular offset voltage is applied to the decision circuit/slicer. The same (quantized) BER value could occur in association with a DFE-corrected receive signal and/or DFE-modified offset voltage, but at a different absolute offset voltage. The difference between these two offset voltage values associated with the same BER (one DFE corrected, one non-corrected) are an exemplary measure of the improvement due to the DFE circuit operation. Such a DFE-compensation offset may then be used to update the voltage offsets for BER measurements made across all timing offsets; not just those made at the reference sampling instant near the center of the eye.

In at least one embodiment, parameters indicative of the sampling offset and the voltage amplitude offset are provided to a chip, which may then generate error counts for a plurality of sampling instants and voltage amplitude offsets, and DFE-corrected error counts at the reference sampling instant for a plurality of DFE-modified offset voltages. Such error counts may be output from the chip, to a system that may be configurable to calculate one or two BERs associated with the received set of error counts and set of DFE-corrected error counts for the provided parameters. For example, referring to FIG. 6, a chip may receive the sampling offset parameter that is indicative of a sampling location along the X axis. The chip may rotate the phase of the sampling clock according to the provided sampling offset parameter using phase interpolator PI, adjust a decision threshold voltage (e.g., the Y axis) of a comparator according to the received voltage amplitude offset, and responsively provide a corresponding error count for that particular measuring point. The error counts may be associated with error '1s' that should have been '0s', and vice versa, In some embodiments, an array of parameters may be provided as measuring points to fill out the measuring points or "blocks" of a "BER grid" or "BER pixels" in which the x-axis coordinate of a given block corresponds to the plurality of sampling instants, the y-axis coordinate of the given block corresponds to variation in the voltage amplitude offset, and the value(s) inside the given block corresponds to the calculated BER(s).

By comparing the DFE-corrected and uncorrected sets of BER values and their corresponding voltage offsets, the improvement in the eye opening of the received signal due to the operation of the DFE circuit may be obtained. That is, a given BER may occur at an offset voltage of 0.1 volt (again, obtained by sampling at a sampling instant near the center of a signaling interval) in a non-DFE corrected received signal, while that BER may be obtained with a voltage offset of 0.3 volt when sampling a DFE-corrected received signal at the reference sampling instant corresponding to center of the signaling interval. Thus, the eye may be opened by 0.2 volt at that given BER. Alternatively, a diagnostic check may be performed amongst a subset of measuring points, e.g., 10 different sampling instants, against 4 different offset voltages for a totally of 40 measuring points. Such a diagnostic check may occur in an off-chip system and may provide the parameters to the eye sampler (e.g., the desired sampling instant and voltage offset) for each measuring point and may observe the set of error counts for all of the measuring points and the set of DFE-compensated error counts for each measuring point at the reference sampling interval. Based on an analysis of the set of error counts and set of DFE-compensated error counts, the diagnostic check may identify a DFE-compensation offset and evaluate if each uncorrected error count is within a sufficient threshold as modified by the DFE-compensation offset.

The eye-scope BER data may be obtained horizontally across they eye (using many sampling instant offsets) without using any DFE correction. The set of eye-scope BER measurements, in one embodiment, is a triplet of data values, having (i) an associated sampling offset relative to the eye-center sampling instant, (ii) a voltage offset value representing a voltage offset applied to alter a decision threshold, and (iii) the resulting measured eye-scope BER value made based on the received set of error counts and the received set of DFE-compensated error counts. This is often visualized as an x value (time offset), a y-value (a slicer offset), and a magnitude (a color or grey scale pixel value) so that an eye diagram may be visualized. In some embodiments as described above, the set of eye-scope BER measurements may include two different BERs associated with respective error types (e.g., a first error type in which is should have been 0s and a second error type in which 0s should have been 1s).

The "raw" eye scope BER data (non-DFE corrected) may be adjusted to reflect what a DFE correction circuit would likely have been able to generate. The set of DFE-adjusted eye-scope BER measurements are generated by using the DFE-compensation offset to adjust the voltage offset values of the non-DFE corrected eye-scope BER measurements. That is, for each triplet in the eye-scope BER data, the eye-scope BER is used to find a matching DFE-compensation offset value. That compensation value may then be used to adjust (add or subtract, as appropriate) the offset value of the triplet. Once all the values are adjusted they may be visualized/plotted as described above to generate a DFE-corrected eye plot as shown in FIG. 9. Note that some compression may occur, where, after adjustment, some vertical/voltage offset values may be associated with more than one BER rate. In such case, the BER rates may be added together, or alternatively, the smaller of the BER rates may be discarded.

In some embodiments, a method includes obtaining respective error counts for a plurality of measurement points, each measurement point corresponding to a data decision at a respective sampling instant according to a respective offset voltage, and obtaining respective DFE-compensated error counts for a subset of measurement points of the plurality of measurement points, the subset of measurement points comprising measurement points taken at a reference sampling instant at a plurality of DFE-modified voltage offsets. The method may further include determining a DFE-compensation offset based on a selected DFE-compensated error count and a corresponding error count for a measurement point taken at the reference sampling instant near the center of the eye. In such embodiments, the selected DFE-compensated error count and the corresponding error count may have equivalent bit-error rates, and different offset voltages. The DFE-compensation offset thus corresponds to a voltage difference between the different offset voltages. In some embodiments, the method further includes applying the DFE-compensation offset to BER contour lines generated from uncorrected data to generate a corrected eye diagram. Alternatively, the DFE-compensation offset may be used as a diagnostic by checking if a predetermined set of measurement points are operating within a given threshold standard In one particular embodiment, a measurement circuit maintains a number of error counts, each associated with a particular received data pattern "filter" composed of a preceding received data bit, current data bit, and following data bit. Thus, in one example a first error counter configured with the filter "1, 1, 0" will count a detected "0" value as a bit error (as it does not agree with the current data bit "1" configured in the filter and received in the matching data sequence) only if preceded by a received data "1" and followed by a received data "0". In a first embodiment the total number of times each filter sequence is matched is also counted, allowing interpretation of the counted errors as a BER. In a second embodiment the measurement circuit operates autonomously for a predetermined number of filter sequence matches, at the end of which its error counter result may be observed and so interpreted.

When configured to verify BER values by measuring over millions or billions of data values, simple binary error counts may provide unnecessary accuracy. In practice, only an indication that, as examples, a few errors, thousands of errors, or millions of errors were seen at the specified measurement point may be required. Thus, interpreting the resulting error counts in a logarithmic or reduced-precision numeric format may be advantageous. One particular measurement circuit embodiment maintains 24-bit binary error counters for implementation convenience but presents the resulting error counts and/or BER values to an eye-scope computation in a pseudo floating-point numerical format, comprising several of the most significant bits of the actual count value (the "fractional" portion), and additional bits indicating an exponential multiplier or scale factor (the "exponent" portion). Thus, an example binary counter value of 0001 1011 1001 0011 may be converted into a three-bit fractional "110" and a five-bit exponent "1100" indicating the fraction should be left-shifted by 12. No limitation is implied by this example, either in formatting of the values or in the size of its comprising numerical fields.

I claim:

1. A method comprising:
    generating, using a data sampler, a sequence of data decisions at a reference sampling instant using a reference voltage;
    generating a two-dimensional map of error counts, each error count generated by comparing decisions from an eye sampler formed at a respective sampling instant of a plurality of sampling instants using a respective voltage offset of a plurality of voltage offsets to a corresponding data decision of the sequence of data decisions made in a same sampling interval, the plurality of sampling instants comprising (i) the reference sampling instant and (ii) sampling instants offset from the reference sampling instant; and
    generating a respective set of DFE-compensated error counts for each transitional data pattern of a pair of transitional data patterns, each DFE-compensated error count of the respective set of DFE-compensated error counts generated by comparing decisions from the eye sampler formed using a DFE-modified voltage offset at the reference sampling instant to corresponding data decisions of the sequence of data decisions made in the same sampling interval, the DFE-modified voltage offset modified by a speculative DFE term associated with the transitional data pattern.

2. The method of claim 1, wherein each error count of the two-dimensional map of error counts and each DFE-compensated error count of the set of DFE-compensated error counts is stored in a respective counter.

3. The method of claim 1, further comprising generating a DFE-compensated two-dimensional map of error counts by modifying each error count of the two-dimensional map of error counts according to each respective set of DFE-compensated error counts for each transitional data pattern of a pair of transitional data patterns.

4. The method of claim 1, wherein the pair of transitional data patterns are triplet data patterns.

5. The method of claim 1, wherein the two dimensional map of error counts and set of DFE-compensated error counts are generated using at least one logical XOR gate connected to an output of the eye sampler and an output of the data sampler.

6. The method of claim 1, further comprising generating the DFE-modified voltage offset by selectively applying historical DFE correction factors to a respective voltage offset of the plurality of voltage offsets at the eye sampler.

7. The method of claim 6, wherein the historical DFE correction factors are analog signals.

8. The method of claim 7, wherein the historical DFE correction factors are selectively applied to a received data signal.

9. The method of claim 1, further comprising outputting the two-dimensional map of error counts and the set of DFE-compensated error counts.

10. An apparatus comprising:
    a data sampler configured to generate a sequence of data decisions at a reference sampling instant using a reference voltage;
    an eye sampler configured to:

generate decisions at a respective sampling instant of a plurality of sampling instants using a respective voltage offset of a plurality of voltage offsets, the plurality of sampling instants comprising (i) the reference sampling instant and (ii) sampling instants offset from the reference sampling instant; and generate DFE-compensated decisions formed using a DFE-modified voltage offset at the reference sampling instant, the DFE-modified voltage offset modified by a speculative DFE term associated with a transitional data pattern of a pair of transitional data patterns; and an error count circuit configured to:

generate a two-dimensional map of error counts, each error count generated by comparing the decisions from the eye sampler to corresponding data decisions of the sequence of data decisions from the data sampler made in a same sampling interval; and generate respective sets of DFE-compensated error counts for each transitional data pattern of the pair of transitional data patterns, each DFE-compensated error count generated by comparing the DFE-compensated decisions from the eye sampler to corresponding data decisions of the sequence of data decisions from the data sampler made in the same sampling interval.

11. The apparatus of claim 10, wherein the error count circuit comprises respective counters to store each error count of the two-dimensional map of error counts and each DFE-compensated error count of the set of DFE-compensated error counts.

12. The apparatus of claim 10 wherein the pair of transitional data patterns are triplet data patterns.

13. The apparatus of claim 10, wherein the error count circuit comprises at least one logical XOR gate connected to (i) an output of the eye sampler for receiving the decisions and the DFE-compensated decisions and (ii) an output of the data sampler for receiving the sequence of data decisions.

14. The apparatus of claim 10, further comprising a DFE voltage generator configured to generate the DFE-modified voltage offset at least in part by selectively applying historical DFE correction factors to a respective voltage offset of the plurality of voltage offsets at the eye sampler.

15. The apparatus of claim 14, wherein the historical DFE correction factors are analog signals.

16. The apparatus of claim 15, further comprising an input sampling stage configured to apply one or more of the historical DFE correction factors to a received data signal.

17. The apparatus of claim 10, wherein the error count circuit is configured to output the two-dimensional map of error counts and the set of DFE-compensated error counts.

18. The method of claim 3, wherein generating the DFE-compensated two-dimensional map of error counts comprises processing the error counts of the two-dimensional map of error counts into contour lines of equal bit-error-rate (BER), and modifying the contour lines of equal BER at least in part according to each respective set of DFE-compensated error counts.

* * * * *